US012230234B2

(12) United States Patent
Steinberger

(10) Patent No.: US 12,230,234 B2
(45) Date of Patent: Feb. 18, 2025

(54) CALIBRATED VIBRATO

(71) Applicant: Richard Ned Steinberger, Nobleboro, ME (US)

(72) Inventor: Richard Ned Steinberger, Nobleboro, ME (US)

(*) Notice: Subject to any disclaimer, the term of this patent is extended or adjusted under 35 U.S.C. 154(b) by 139 days.

(21) Appl. No.: 17/367,716

(22) Filed: Jul. 6, 2021

(65) Prior Publication Data

US 2022/0013095 A1 Jan. 13, 2022

Related U.S. Application Data

(60) Provisional application No. 63/049,060, filed on Jul. 7, 2020.

(51) Int. Cl.
*G10D 3/153* (2020.01)
*G10D 3/12* (2020.01)

(52) U.S. Cl.
CPC .............. *G10D 3/153* (2020.02); *G10D 3/12* (2013.01)

(58) Field of Classification Search
CPC ............. G10D 3/153; G10D 3/12; G10D 1/08
See application file for complete search history.

(56) References Cited

U.S. PATENT DOCUMENTS 4,475,432 A 10/1984 Stroh
4,579,033 A 4/1986 Edwards
4,632,004 A 12/1986 Steinberger
4,632,005 A 12/1986 Steinberger
4,690,028 A 9/1987 Steinberger
4,704,936 A 11/1987 Steinberger
4,742,750 A * 5/1988 Storey .................... G10D 3/153 84/267
4,878,413 A 11/1989 Steinberger
4,892,025 A 1/1990 Steinberger
5,808,216 A * 9/1998 Fisher, IV .............. G10D 3/153 84/313
5,932,822 A 8/1999 Bernstein
7,960,630 B2 1/2011 Steinberger
7,888,571 B2 2/2011 Steinberger
8,017,844 B2 9/2011 Steinberger
10,255,893 B1 4/2019 Clark
10,810,976 B2 10/2020 Augustine
2014/0202307 A1* 7/2014 Rose ...................... G10D 3/153 84/313

* cited by examiner

*Primary Examiner* — Kimberly R Lockett
(74) *Attorney, Agent, or Firm* — Alix, Yale & Ristas, LLP

(57) ABSTRACT

A calibrated vibrato for use with a stringed musical instrument that allows pitch change, while keeping the instrument in tune. The calibrated vibrato uses pre-set string guides with particular offsets and heights for specific types of strings. The calibrated vibrato can be used with the disclosed locking nut, adjustable spring and adjustable saddles. The locking nut provides lateral force on the strings and an interlocking design between blocks. The interlocking blocks allow the locking nut to be unscrewed, while reducing the change of accidentally having the end block fall off.

17 Claims, 15 Drawing Sheets

CALIBRATED VIBRATO

CROSS REFERENCE TO RELATED APPLICATIONS

The present application is a United Stated utility patent application claiming priority to U.S. Provisional Patent Application No. 63/049,060 filed Jul. 7, 2020, which is hereby incorporated by reference in its entirety.

BACKGROUND

1. Field

The present disclosure relates to vibratos used on stringed musical instruments, specifically a calibrated vibrato capable of keeping a stringed instrument in tune as the vibrato is actuated.

2. Discussion of Prior Art

Vibrato mechanisms mounted on stringed musical instruments change the pitch of the strings when activated. Vibratos change the tension and pitch of the strings by alternately increasing and decreasing the length of the vibrating portion of the strings. Conventional vibratos change the length of all strings at the same rate, even though the strings on an instrument, such as a guitar, are not identical and have different stretch rates. This approach leads to the strings going out of tune with each other when the vibrato is activated because each string is displaced the same amount when a vibrato is activated.

The present invention is directed at overcoming the disadvantages of the prior art.

BRIEF SUMMARY

The present invention accomplishes this goal by providing a calibrated vibrato that controls the displacement of each string individually so that the strings maintain relative pitch when activated. Through applying a precise displacement in each string, each string experiences a precise change in tension with a correspondingly precise change in pitch, keeping the strings in relative tune when the calibrated vibrato is activated.

The disclosure includes a calibrated vibrato mounted on the body of an instrument and a locking nut mounted between the headstock and neck of an instrument. The calibrated vibrato uses a pre-set string guide for each string with a specific height and offset, under which the strings are fed so that the strings stay in tune with each other when the calibrated vibrato is activated. The calibrated vibrato can include an adjustable counter spring to adjust the rotational position of the tailpiece when the vibrato is not activated by the player. The calibrated vibrato can also include a locking mechanism to lock a moveable tailpiece in a certain position or allow it to be activated. A locking nut near the headstock is preferably used to prevent the strings from stretching between the nut and the tuner post and to prevent friction over a nut from destabilizing the tuning.

The disclosure includes a locking nut mounted between the neck and headstock that provides a lateral clamping force. The locking nut includes a U-shaped base with a notched side, which makes the locking nut convenient to use with a typical headstock where the strings flare outward beyond the nut. The locking nut also includes a curved portion extending from the side of the base opposite the notched side, which acts as a "zero fret." The locking nut uses blocks slidably fixed to one another via a fastener, which can be a bolt, that fastens to an end block via an internal threaded area located within the adjacent block to provide additional threads for the fastener to engage, preventing a user from accidentally unscrewing the fastener completely out of the threaded area.

The disclosure also includes an optional low friction bridge assembly configured with individually adjustable saddles using a point bearing to reduce friction.

The disclosure herein includes a calibrated vibrato, which comprises: a moveable tailpiece assembly comprising: a plurality of pre-set string guides, each pre-set string guide having an offset and height configured for a specific type of string; and wherein the pre-set string guides are configured to keep a conventional set of strings in relative tune when the calibrated vibrato is activated. In the calibrated vibrato, the pre-set string guides can be mounted on an upper surface of the moveable tailpiece assembly opposite a post extending from a lower surface, the post can have a proximate end towards the string guides and a distal end away from the string guides; and the moveable tailpiece assembly can be rotatably mounted to a fixed tailpiece base; and a spring attached on a first end to the distal end of the post and attached on an opposite end at a spring fixture fixed relative to the fixed tailpiece base. The calibrated vibrato can include at least one string passing through a pre-set string guide on a proximate end; and wherein the string passes through a locking nut on a distal end.

In the calibrated vibrato, the moveable tailpiece can further include a tuner holding a ball end of a string, the tuner comprising: a body mounted on at pivot point; an indented portion on the body configured to hold the ball end of a string; a threaded opening on the body with an axis in a direction normal to the pivot point; a string path on the body, located between the indented portion and the threaded opening; and a threaded rod configured to axially displace the threaded opening. In the calibrated vibrato, the pre-set string guides can be mounted to the moveable tailpiece assembly with a through-mounted screw and wherein an adjustment spring is located between the pre-set string guides and the moveable tailpiece assembly, the adjustment spring also being located axially about the screw. In the calibrated vibrato, a spring can be attached on a first end to the distal end of the post and attached on an opposite end at a spring mount attached to the spring fixture. In the calibrated vibrato, the spring can be a coil spring, where the spring mount can be displaceable in a direction along an axis of the coil spring. The calibrated vibrato can further include a rod with a threaded portion on one end and a thumb wheel fixed to an opposite end, where the spring mount can include a threaded opening corresponding with the threaded portion of the rod, where the threaded opening can be configured to displace the spring mount in an axial direction of the rod; and where the spring mount can be configured to slide relative to the spring fixture.

In the calibrated vibrato, the fixed tailpiece base can have a triangular protrusion facing the moveable tailpiece assembly, where the moveable tailpiece assembly can have a triangular relief facing the fixed tailpiece base, and the triangular protrusion and relief can be configured to contact one another and allow rotation of the moveable tailpiece assembly relative to the fixed tailpiece base. The calibrated vibrato can be configured to have a first locked position restricting movement of the moveable tailpiece relative to the fixed tailpiece base and an unlocked position where movement of the moveable tailpiece relative to the fixed tailpiece base is unrestricted. The calibrated vibrato can be configured to also have a second locked position restricting movement of the moveable tailpiece relative to the fixed tailpiece base and a third locked position restricting movement of the moveable tailpiece relative to the fixed tailpiece base. The calibrated vibrato can further include where the fixed tailpiece base further comprises a rotatably attached lever comprising a protrusion facing the moveable tailpiece assembly; wherein the moveable tailpiece assembly further comprises an indentation facing the protrusion on the lever, the indentation configured to engage the protrusion; and wherein the protrusion is configured to engage at least a locked position and an unlocked position.

The calibrated vibrato can further include a locking nut with a base fixed relative to the fixed tailpiece base; the base having a generally U-shaped profile with a first wall facing towards the pre-set string guides, a second wall facing away from the pre-set string guides, a height, a length and a width; wherein the first wall comprises a radiused upper portion configured to act as a zero-fret; a central block fixed to the center of the base, the central block having a cylindrical opening in a direction parallel to the length of the base; a first end block, a second block and a third block, each having a cylindrical opening in a direction parallel to the length of the base; the first end block comprising an extension positioned between the second block and the base, wherein the bottom of the second block is configured to nest into a top surface of the extension from the first end block; the third block comprising an internal void configured to interlock with a second end block; the second end block comprising a threaded opening with an axis in a direction parallel to the length of the base, wherein the threaded opening is configured to be positioned in the internal void of the third block when engaged in locking strings; the central block, the first end block, the first block, the second block and the second end block being configured to fit within the U-shaped profile of the base; a bolt comprising a head on one end and a threaded area on an opposite end, the threaded area configured to engage the threaded opening on the second end block; and the end block comprising an internal open space at least as large as the cylindrical openings along an axis of the bolt. In the locking nut of the calibrated vibrato, the second wall of the locking nut base can further include notches corresponding to the locations where the first end block and the first block contact one another, where the first block and central block contact one another, where the central block and the second block contact one another and where the second block and the second end block contact one another.

The disclosure also includes a locking nut for use on stringed musical instruments, which includes: a fixed base; the base having a generally U-shaped profile with a with a first wall and a second wall, a length, a height and a width; a central block fixed to the center of the base, the central block having a cylindrical opening in a direction parallel to the length of the base; a first end block, a second block and a third block, each having a cylindrical opening in a direction parallel to the length of the base; the first end block comprising an extension positioned between the second block and the base, wherein the bottom of the second block is configured to nest into a top surface of the extension from the first end block; the third block comprising an internal void configured to interlock with a second end block; the second end block comprising a threaded opening with an axis in a direction parallel to the long direction of the base, wherein the threaded opening is configured to be positioned in the internal void of the third block, when engaged in locking strings; the central block, the first end block, the first block, the second block and the second end block being configured to fit within the U-shaped profile of the base; a bolt comprising a head on one end and a threaded area on an opposite end, the threaded area configured to engage the threaded opening on the second end block; and the end block comprising an internal open space at least as large as the cylindrical openings along the and axis of the bolt. The locking nut can further have a second wall of the locking nut base further comprises notches corresponding to the locations where the first end block and the first block contact one another, where the first block and central block contact one another, where the central block and the second block contact one another and where the second block and the second end block contact one another. The locking nut can further have the first wall comprising a radiused upper portion configured to act as a zero-fret.

BRIEF DESCRIPTION OF THE DRAWINGS

Many advantages of the present invention will be apparent to those skilled in the art with a reading of this specification in conjunction with the attached drawings, wherein like reference numerals are applied to like elements and wherein.

DETAILED DESCRIPTION

Illustrative embodiments are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. The calibrated vibrato disclosed herein boasts a variety of inventive features and components that warrant patent protection, both individually and in combination.

The present disclosure relates to a calibrated vibrato for a stringed musical instrument, configured to keep a plurality of strings in tune with each other as the vibrato is activated.

Figure 1:
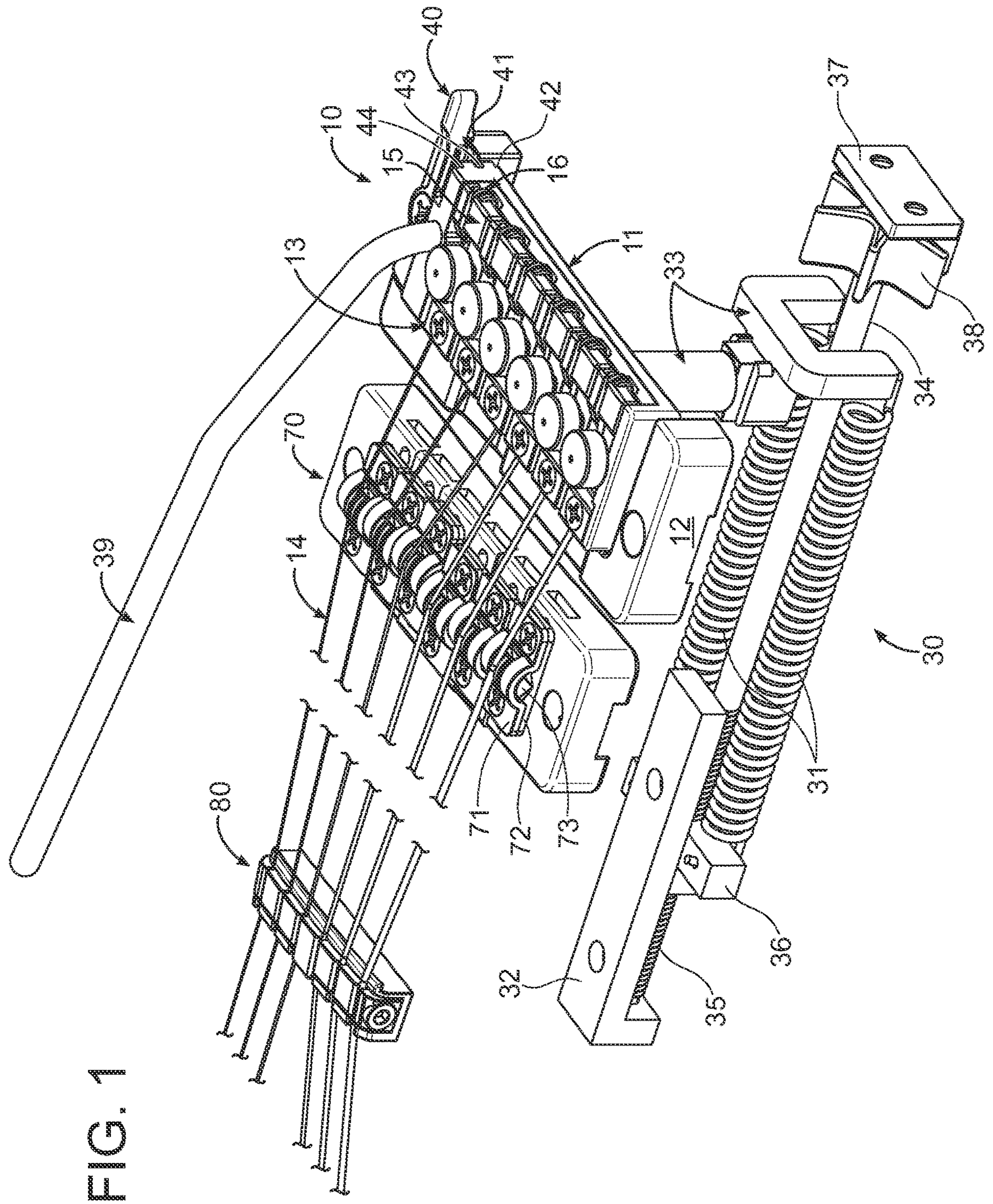
FIG. 1 is a perspective view of a calibrated vibrato and locking nut, with the adjustable springs mounted in the instrument's body shown.

In FIG. 1 is a perspective view of a calibrated vibrato 10 with an adjustable spring assembly 30 mounted within the body of an instrument, an adjustable low friction bridge assembly 70 and a locking nut assembly 80. The calibrated vibrato 10 can include a moveable tailpiece assembly 11, configured to pivot against a tailpiece base 12 fixed to the body of an instrument. Mounted to the moveable tailpiece assembly 11 are unique pre-set string guides 13 for each string 14 on the instrument. The string guides 13 have a precise height and offset, where the string 14 exits the string guide 13. The string guides 13 provide the precise amount of displacement needed for each string to keep then in tune when the calibrated vibrato 10 is activated. Each string can have a different stretch rate and the string guides 13 can compensate for this variability in stretch rate to precisely tension each string to keep the instrument in tune as the calibrated vibrato 10 is activated. Different string gauges and construction can require slight adjustments to the height and offset of the string guides 13. In some embodiments, the string guides 13 are easily and individually adjustable to accommodate different string gauges and construction available to users. The string guides 13 can be pre-set in that their particular height and offset can be pre-set for a specific type of string (such as, for example, the instrument string's note and/or construction).

The moveable tailpiece assembly 11 can also include a fine tuner 15 holding the ball end 16 of the strings 14.

The adjustable spring assembly 30 can include one or more springs 31 fixed on one end to a mounting block 32 fixed relative to the fixed tailpiece base 12 and on the other end to a post 33 extending from the moveable tailpiece assembly 11. The adjustable spring assembly can also include an adjuster rod 34 comprising a threaded area 35 on one end and a thumb wheel 38 on an opposite end. The thumb wheel 38 can be a paddle wheel in some embodiments. The threaded area 35 engages a threaded block 36 slidably mounted to the mounting block 32. The end of the adjuster rod 34 with a thumb wheel 38 rotates against a fixed plate 37 fixed relative to the fixed tailpiece base 12 and mounted inside the body of an instrument. The thumb wheel 38 can be accessibly from an opening on the back of the body of an instrument to adjust the amount of spring tension on the post 33.

The adjustable low friction saddle assembly 70 can include individual saddles 71 for each string 14 that are adjustable in the plane between the ball end 16 and the locking nut 80. Each individual saddle 71 can include a "V" shaped base 72, which allows a corresponding rocking element 73 to rotate within the confines of the "V." The rocking element 73 rotating within the "V" shaped base reduces friction.

The calibrated vibrato 10 preferably uses a locking nut to prevent the strings 14 from stretching between the nut and the tuning posts. It is preferable to use the disclosed locking nut 80 for ease in replacing strings 14 and for secure locking action on the strings 14.

Figure 2:
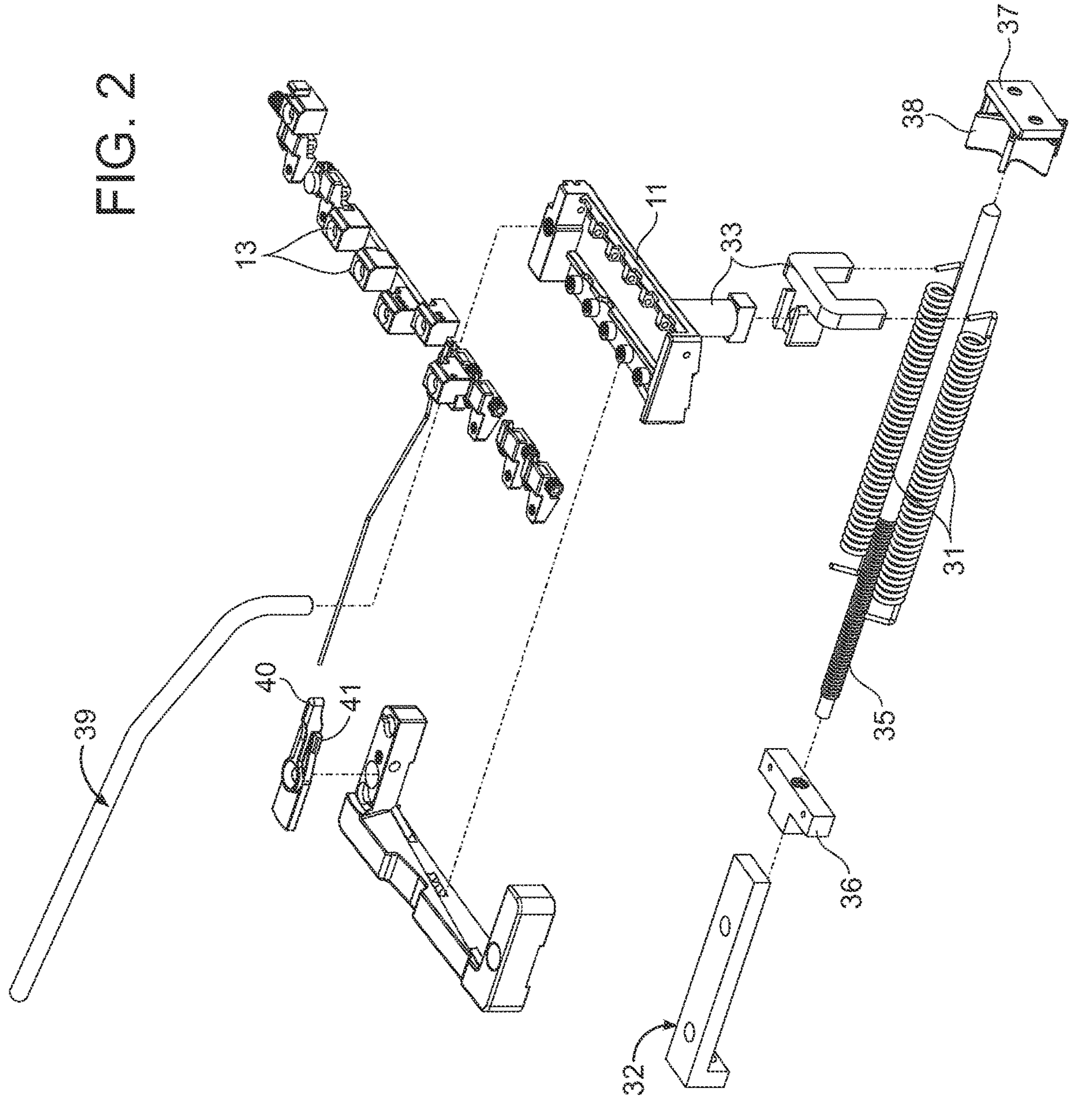
FIG. 2 is an exploded perspective view of a calibrated vibrato, showing the adjustable blocks designed to calibrate the displacement of each string when the calibrated vibrato is activated.

In FIG. 2 is an exploded view of the string guides 13 from a perspective view similar to FIG. 1. The string guides 13 can be individually replaced to change the height and offset of each for changes in the string gauge and/or construction.

Figure 3:
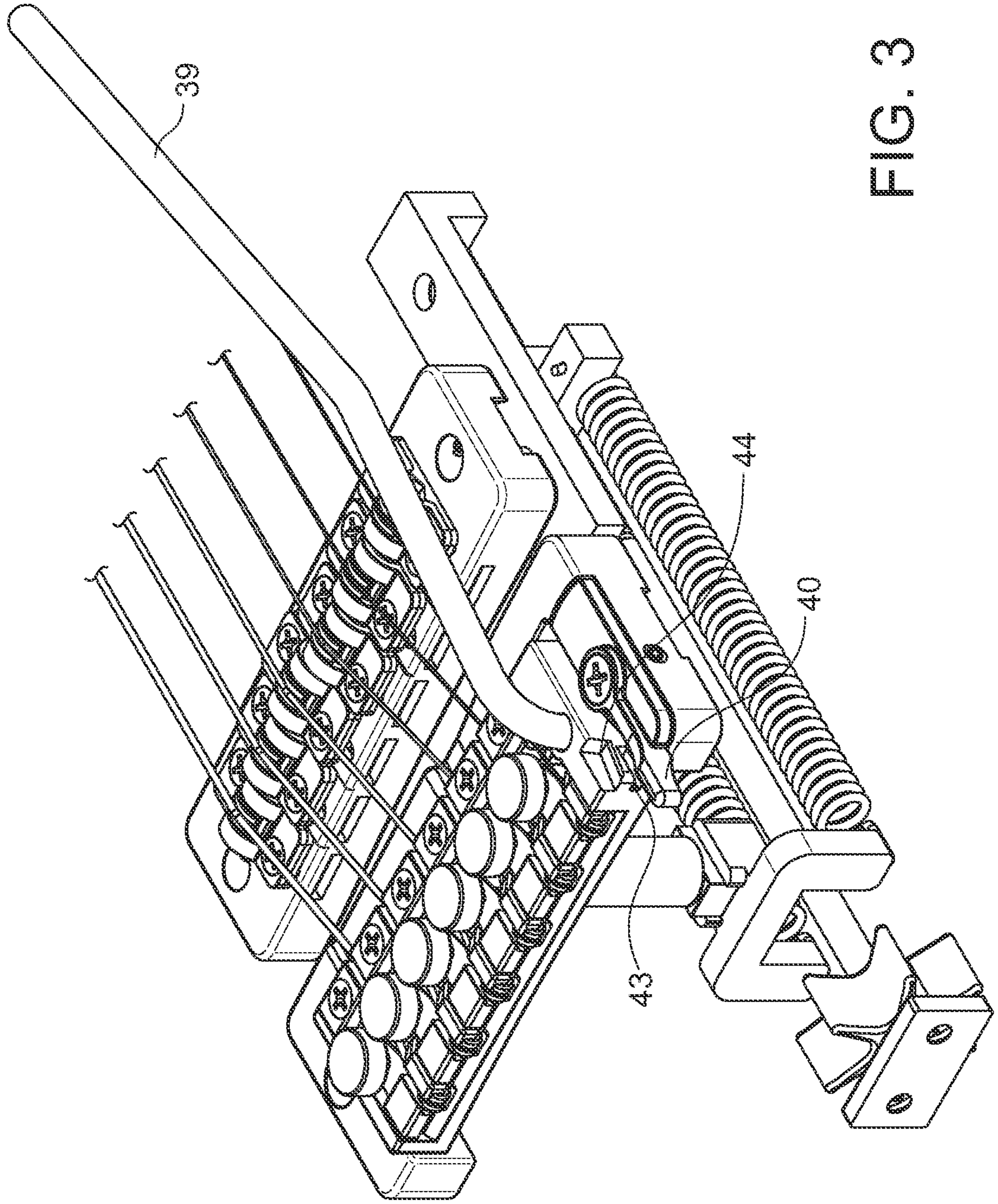
FIG. 3 is an alternate perspective view of a calibrated vibrato and locking nut, with the adjustable springs mounted in the instrument's body shown.

In FIG. 3 is an alternate perspective view of the calibrated vibrato 10 with an adjustable spring assembly 30 mounted within the body of an instrument. The locking lever 40 I that is rotatably fixed to the tailpiece base 12 is visible in FIG. 3. The locking lever 40 can be sized to engage at least one position in the moveable tailpiece assembly 11 to lock the moveable tailpiece assembly 11 in a particular position. In some embodiments, the moveable tailpiece assembly 11 includes a first position 42, a second position 43 and a third position 44, where the second position 43 is positioned between the first position 42 and the third position 44. A protrusion 41 is fixed to the locking lever 40 and sized to fit within the bounds of the second position 43. The first position 42 and the third position 44 can optionally include an upper and lower side to fully enclose the locking tab 41 on its upper and lower surfaces. Due to the action of the adjustable spring assembly 30, the first position 42 can include only an upper wall and the third position 44 can include only a lower wall, where the third position 44 is at the upper end and the first position 42 is at the lower end.

Figure 4:
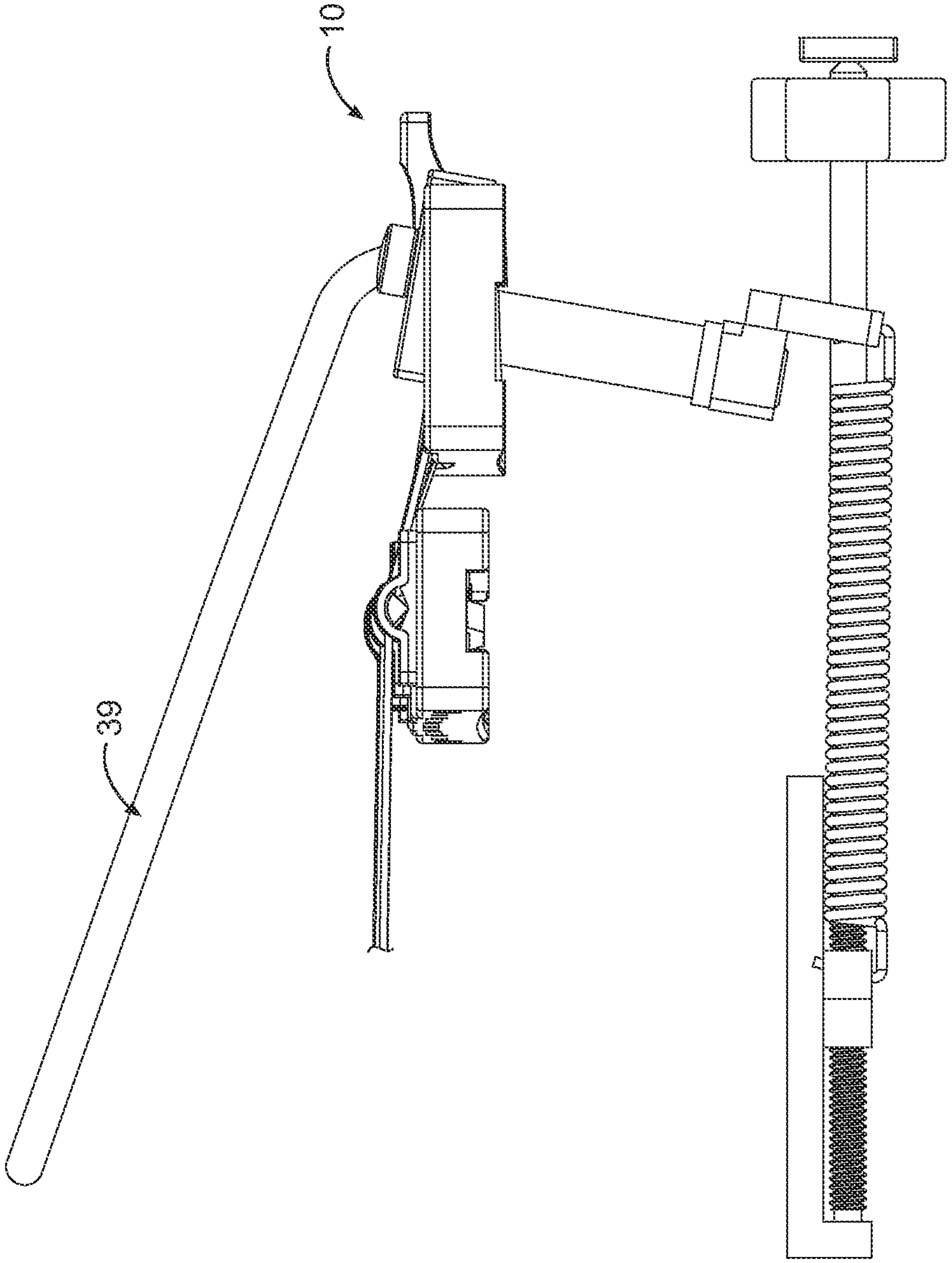
FIG. 4 is a side view of a calibrated vibrato and the adjustable springs mounted in the instrument's body in a neutral, non-activated state.
Figure 5:
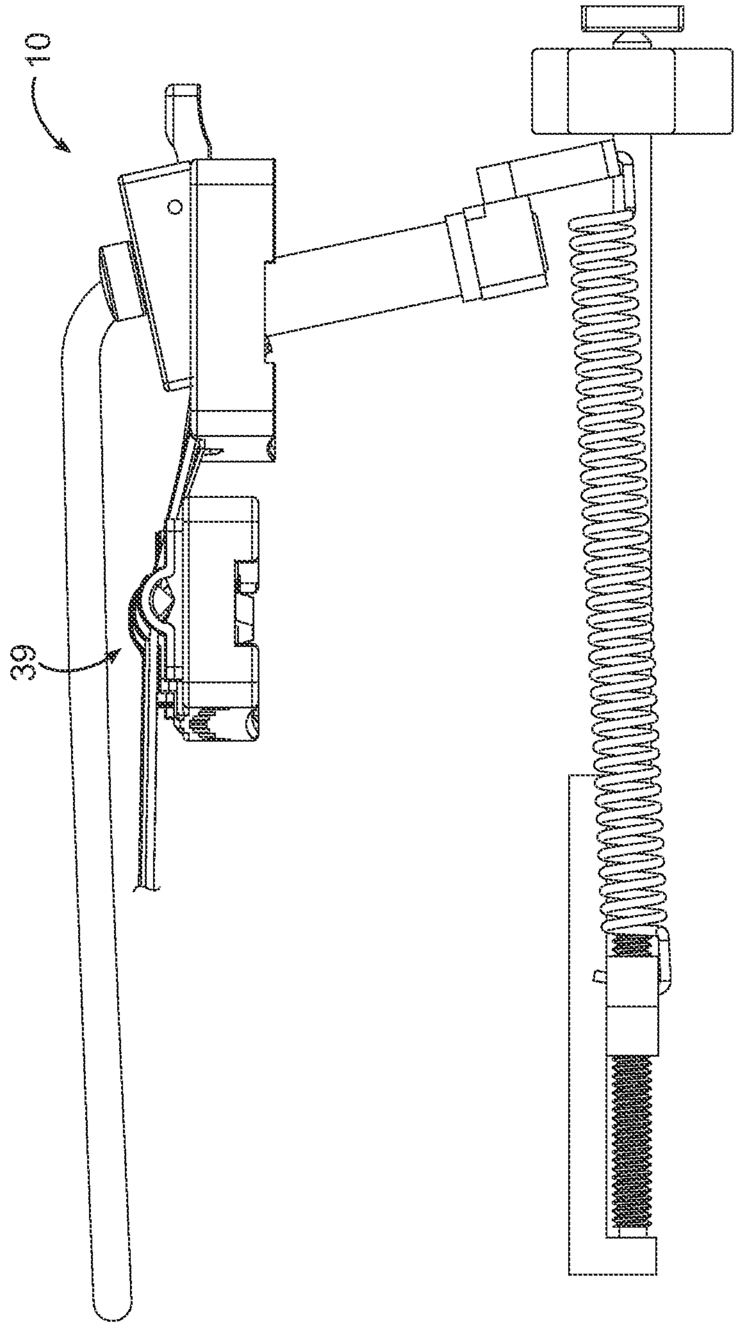
FIG. 5 is a side view of a calibrated vibrato and the adjustable springs mounted in the instrument's body in an activated state.

FIGS. 4 and 5 are side views of the calibrated vibrato 10 with an adjustable spring assembly 30 mounted within the body of an instrument, showing the range of motion when activating the calibrated vibrato 10 with the handle 39. In FIG. 4, the calibrated vibrato 10 is in a neutral position, where the instrument can be played at its regular tuning. In FIG. 5, the handle 39 has been moved towards the body of the instrument for the maximum amount of pitch change possible in this example. The handle 39 can be moved anywhere in this range to alter the amount of pitch change in the strings 14.

Figure 6:
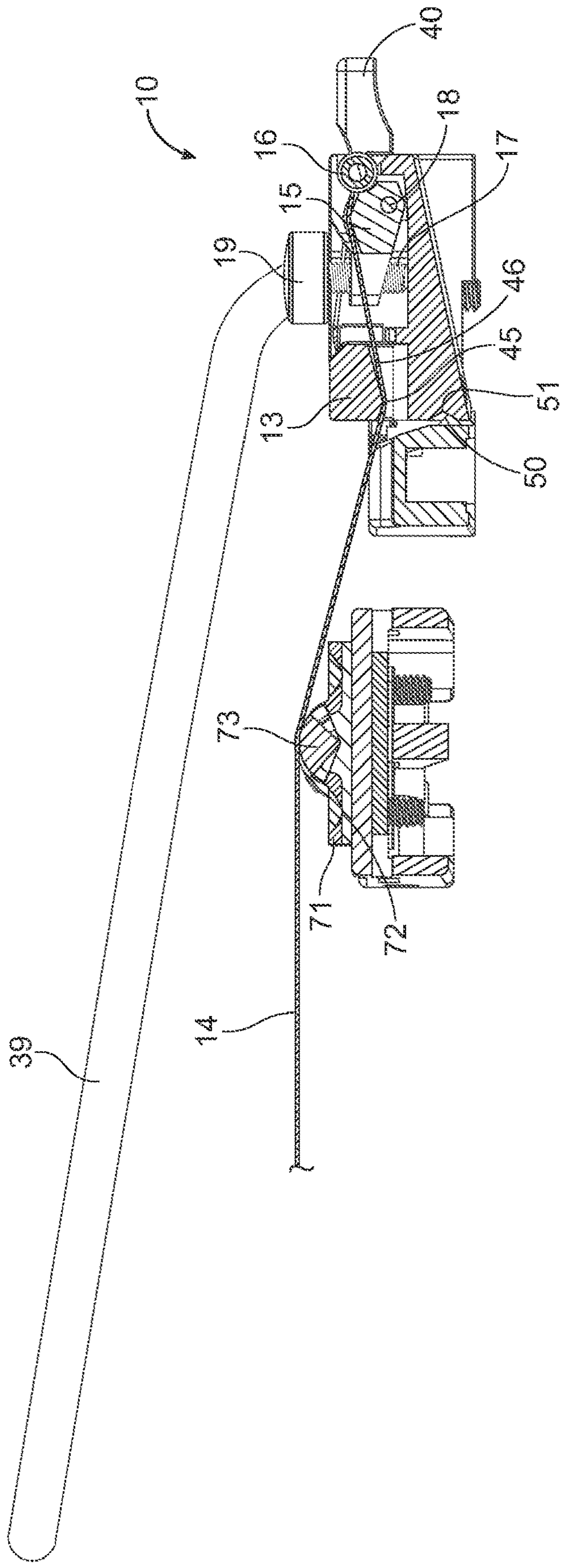
FIG. 6 is a side sectioned view a calibrated vibrato, showing the contact point between the string and the calibrated blocks, along with the tuning mechanism.

In FIG. 6 is a side sectioned view of the calibrated vibrato 10 with an adjustable spring assembly 30 mounted within the body of an instrument and an adjustable low friction bridge assembly 70. The moveable tailpiece assembly 11 rotates relative to the tailpiece base 12 on triangular protrusions 50 fixed to the tailpiece base 12. The moveable tailpiece assembly 11 includes triangular reliefs 51 facing the triangular protrusions 50 to allow low friction rotation. The fine tuner 15 on the moveable tailpiece assembly 11 can include a threaded opening 17 and a pivot point 18 between the threaded opening and the ball end 16 of the strings 14. The threaded opening 17 can have an axis normal to an axis of the pivot point 18. Through the threaded opening 17 can be a tuning knob 19 with a threaded screw corresponding to the thread size and pitch in the threaded opening 17, where turning the tuning knob 19 causes rotation about the pivot point 18. The location where the string 14 contacts the string guide 13 is visible in FIG. 6. The contact point 45 between the string 14 and the string guide 13 is located between the ends of the curved profile 46 pressing against the string 14.

Figure 7A:
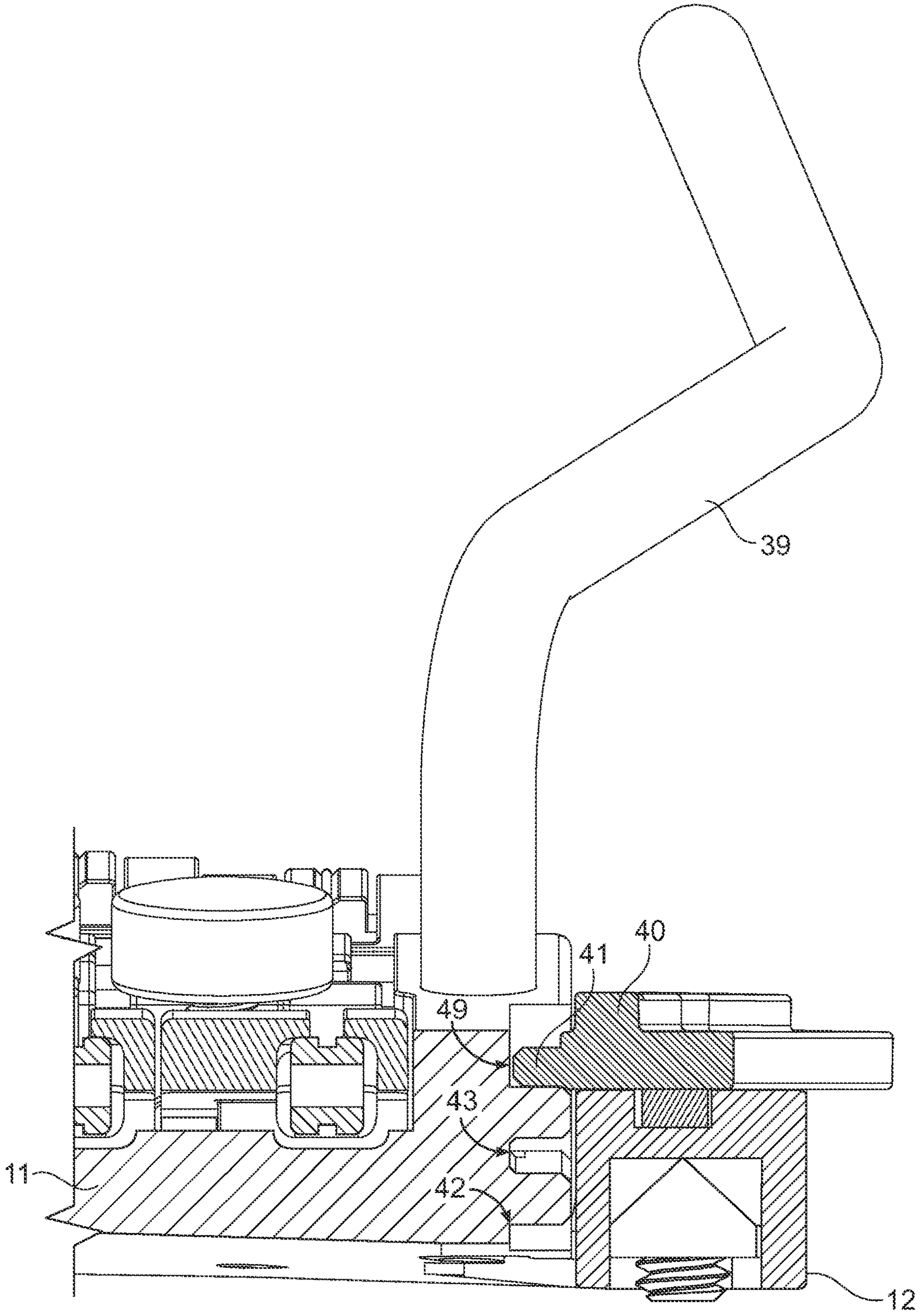
FIG. 7A is a sectioned view of the calibrated vibrato fixed in a first position.
Figure 7B:
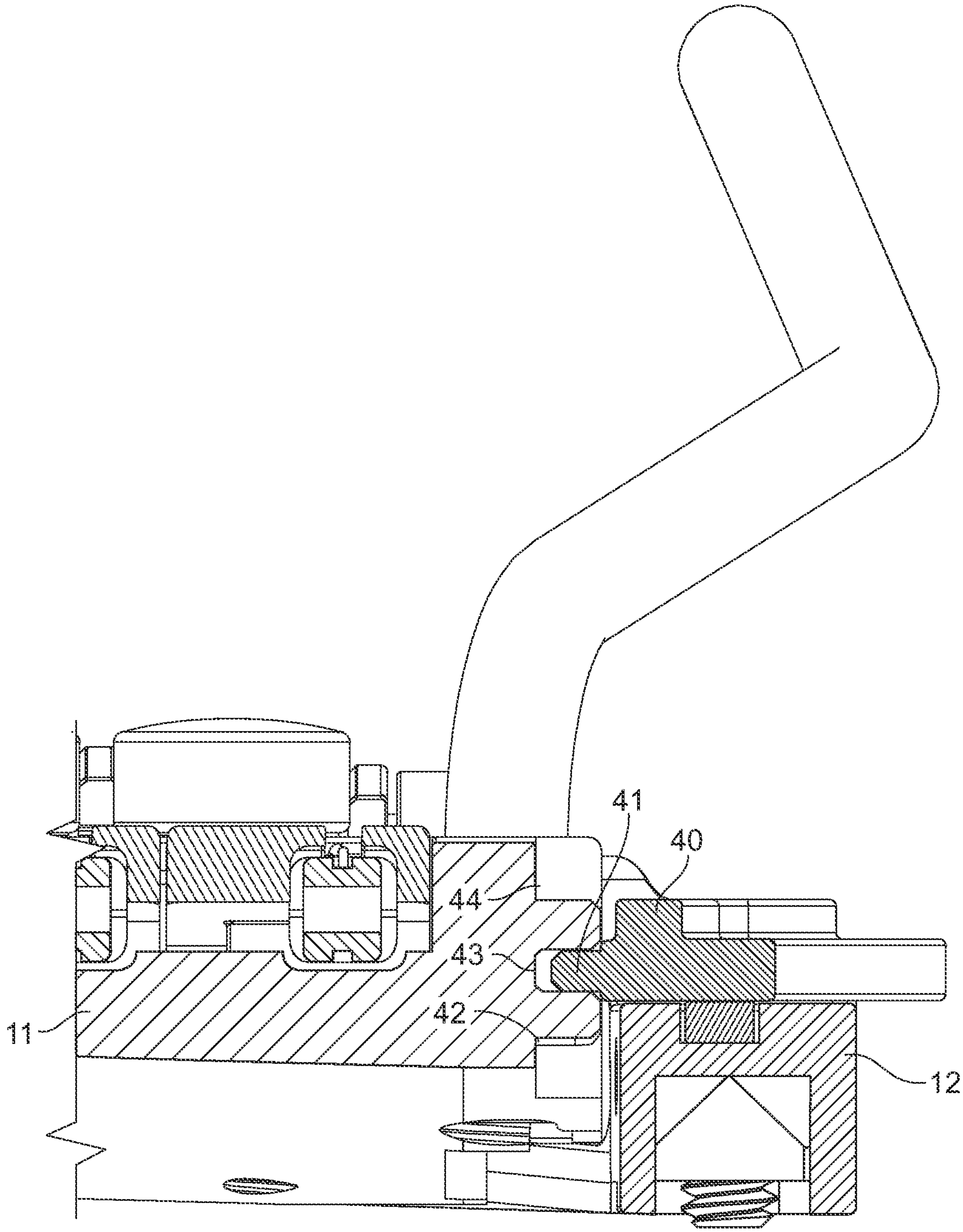
FIG. 7B is a sectioned view of the calibrated vibrato fixed in a second position.
Figure 7C:
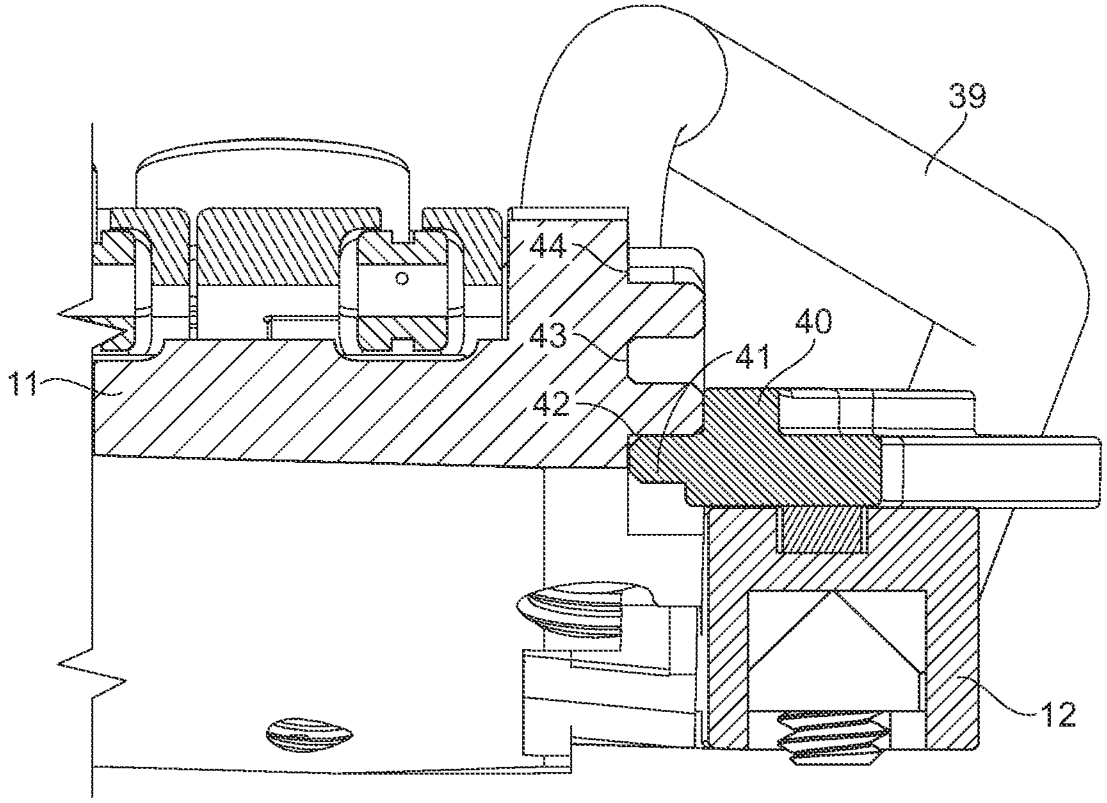
FIG. 7C is a sectioned view of the calibrated vibrato fixed in a third position.
Figure 7D:
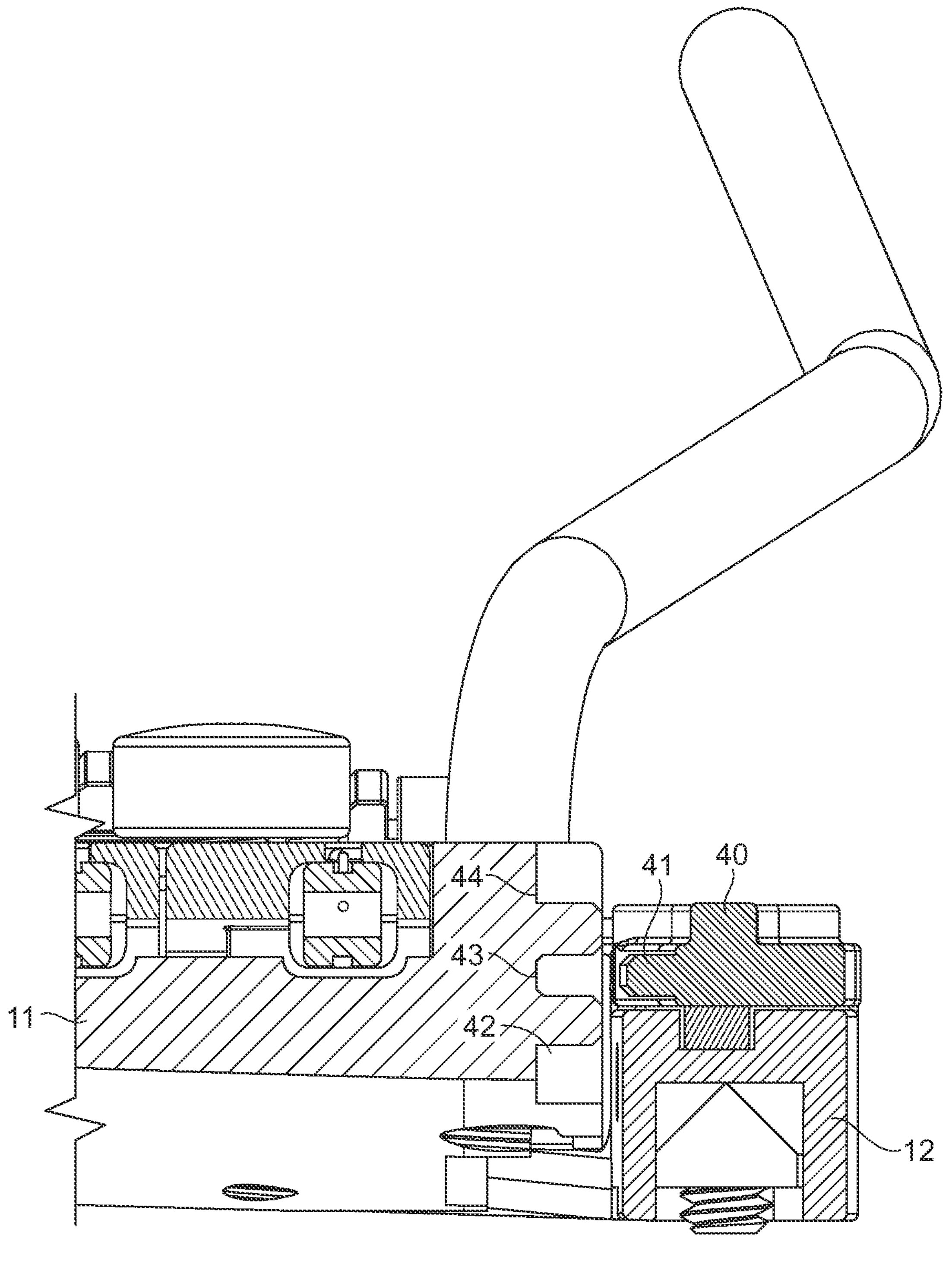
FIG. 7D is a view of the calibrated vibrato in an unlocked position.

FIGS. 7A-7C show the calibrated vibrato 10 locked in the first position 42 (FIG. 7A), the second position 43 (FIG. 7B) and the third position 44 (FIG. 7C). The protrusion 41 fixed to the locking lever 40 can lock the calibrated vibrato 10 in the first position 42, the second position 43 or the third position 44, which keeps the instrument in a particular pitch associated with the position. The protrusion 41 fixed to the locking lever 40 can also be set in an unlocked position, such as in FIGS. 1 and 7D. In the unlocked position, the handle 39 can be used to rotate the moveable tailpiece assembly 11 to vary the pitch of the strings.

Figure 8:
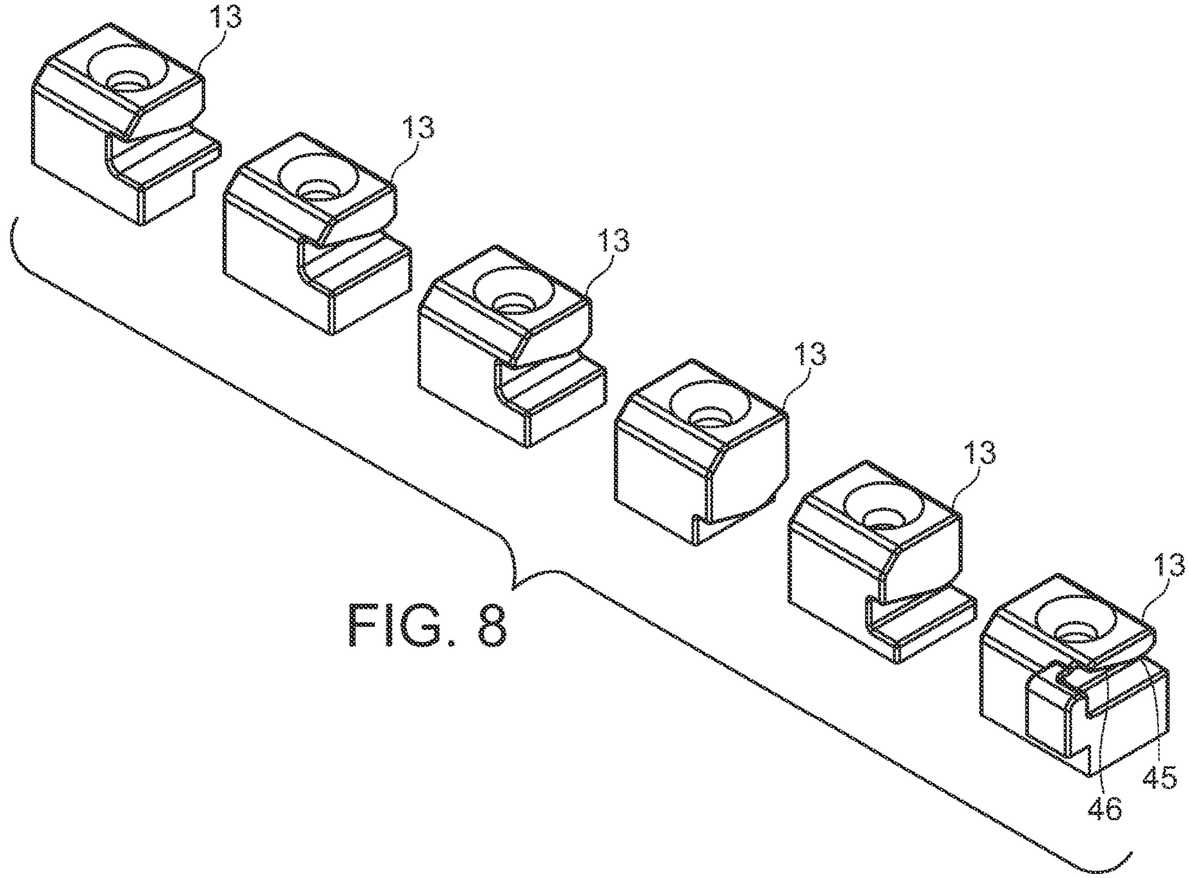
FIG. 8 is a perspective view of the guide positions, showing the different height and offsets of each guide.

FIG. 8 shows the string guides 13 in detail, depicting the variations in height and offset for each successive string 14 in an exemplary instrument. The contact point 45 and the curved profile 46 pressing against the string 14 is identified on a single string guide 13 in FIG. 8.

Figure 9:
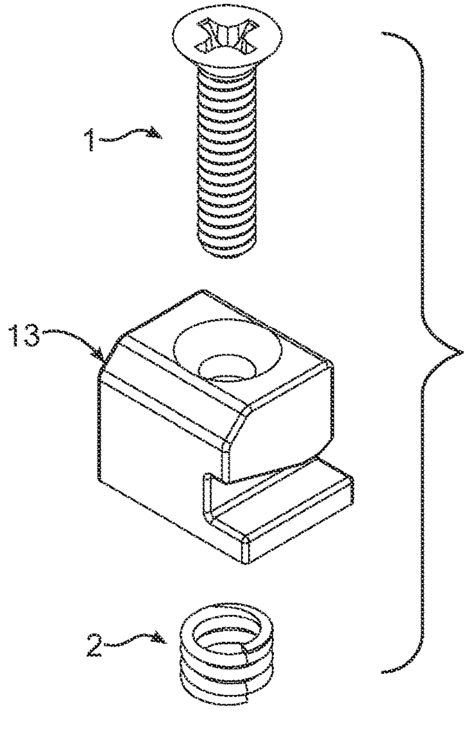
FIG. 9 is an exploded view of a single string guide showing the associated screw and spring fixing it to the pivoting tailpiece.

In FIG. 9 is an exploded perspective view of a single string guide 13 showing its relationship with the screw 47 and spring 48 used to mount it to the moveable tailpiece assembly 11. The screw 47 secures the string guide 13 to the upper surface of the moveable tailpiece assembly 11. The spring 48 is located between the string guide 13 and the moveable tailpiece assembly 11 to allow for minor tuning due to slight differences in strings.

Figure 10:
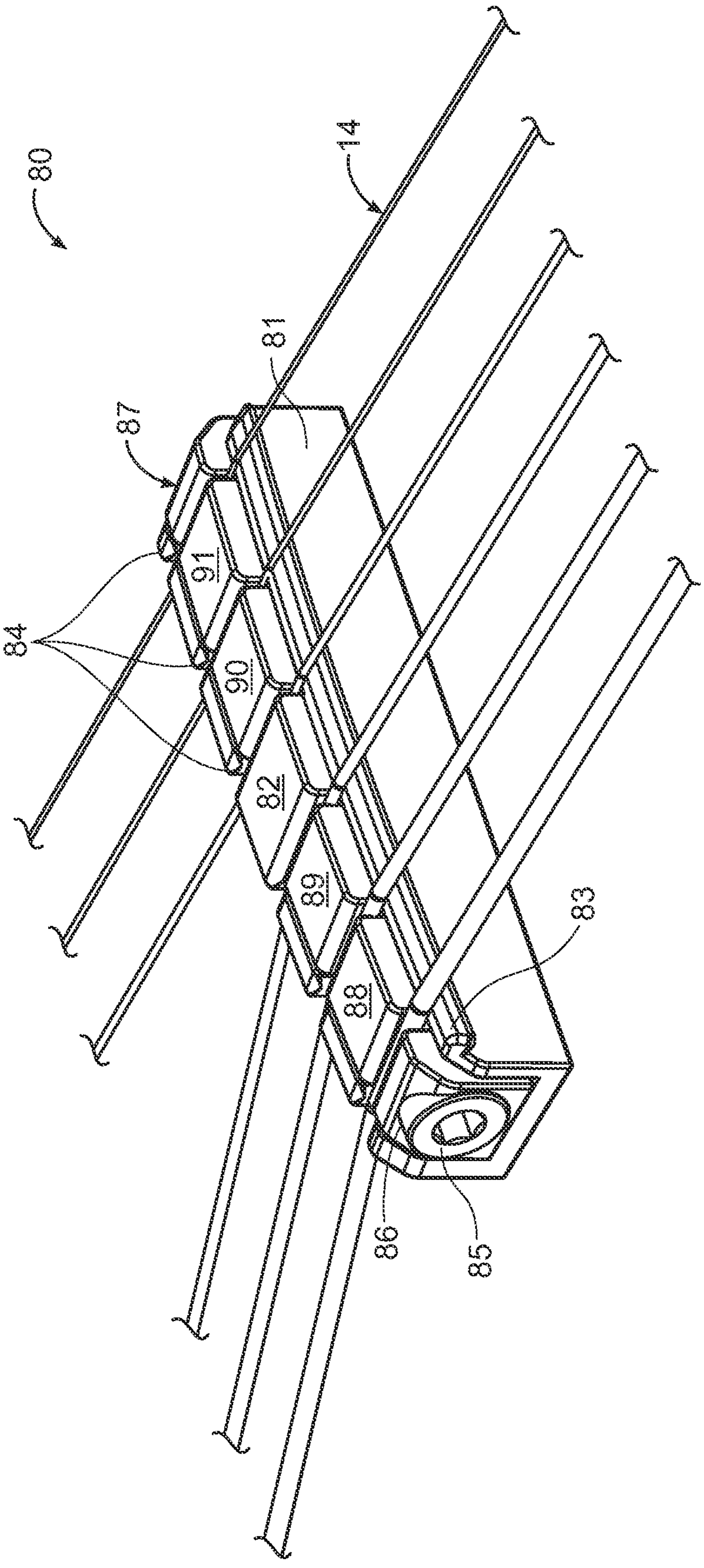
FIG. 10 is a perspective view of the locking nut with strings locked in place.

In FIG. 10 is a perspective view of the locking nut 80 with strings 14 locked into place and viewed from the direction of the neck. The locking nut 80 can have a base 81 in the shape of a U-shaped channel fixed to an instrument between the neck and headstock. The base 81 can include a central block 82 fixed to the base 81, the central block 82 having an opening parallel to the direction of the channel shape of the base 81. The base can also include a first wall with a curved edge 83 in the direction towards the neck that also contacts the strings 14 when in a locked position. A second wall of the base 81 facing towards the headstock can have notches 84 that prevent the strings 14 from applying a side pressure on the blocks when changing strings.

Figure 11:
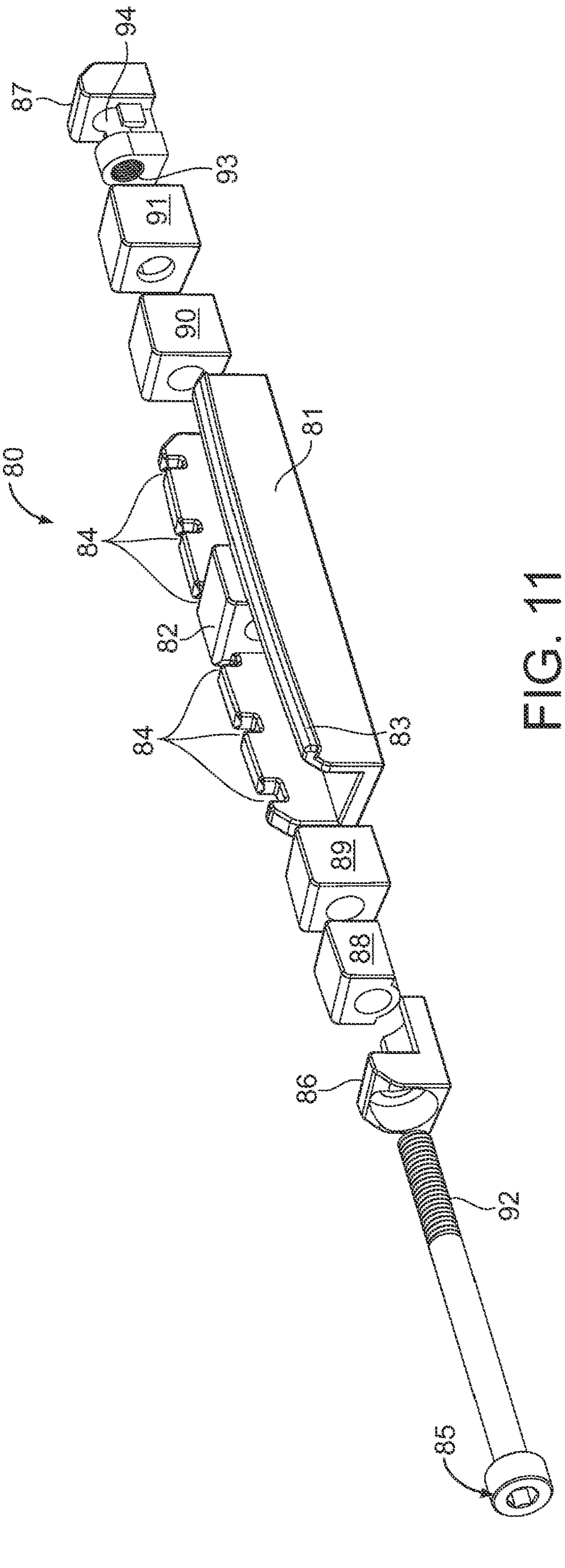
FIG. 11 is an exploded upper perspective view of the locking nut.
Figure 12:
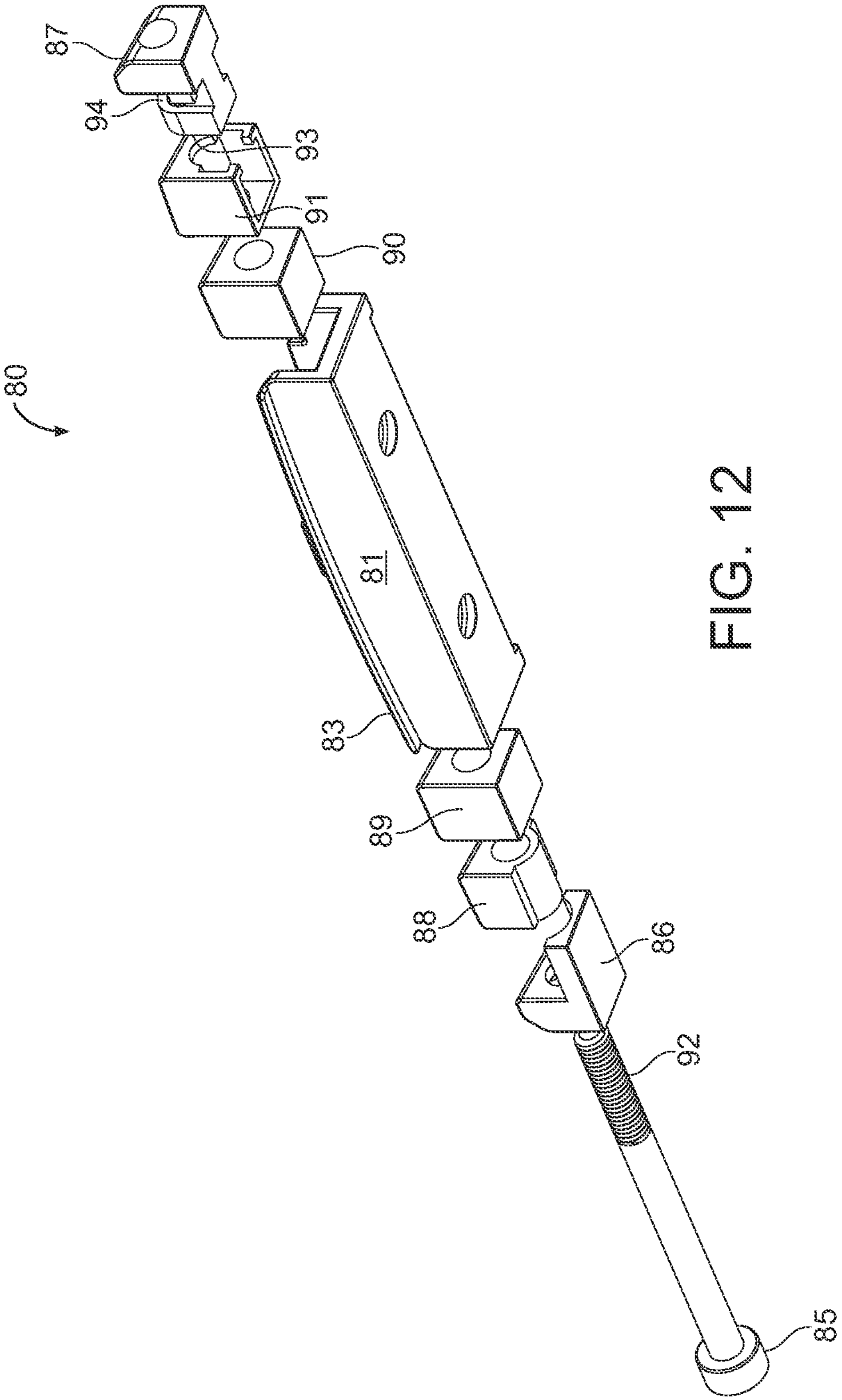
FIG. 12 is an exploded lower perspective view of the locking nut.

The number of blocks needed in the locking nut depends on the particular instrument being used and the example in FIGS. 10-12 is configured for a six string instrument. In a six string instrument, end blocks 86 and 87 are used with intermediate blocks 88-91. Each of end block 86 and the intermediate blocks 88-91 contain openings parallel to the length of the U-shaped channel of the base 81 to accommodate the bolt 85.

In FIG. 11 is an exploded upper perspective view of the locking nut 80. The bolt 85 includes a threaded area 92 that engages with a corresponding threaded opening 93 in end block 87. The threaded opening 93 in end block 87 nests within the adjacent block 91, to provide a gap 94 between the threaded opening 93 and the outer edge of the end block 87. This gap 94 allows provides excessive protrusion of the threaded area 92 beyond the threaded opening 93 so that the bolt 85 can be unscrewed to loosen the locking nut 80 without fully disengaging from the threaded opening 93. The gap 94 is preferably at least as large as the diameter of the bolt 85 in an axial direction of the bolt 85.

In FIG. 12 is an exploded lower perspective view of the locking nut 80. The nesting of the threaded opening 93 fixed to end block 87 within block 91 is visible in this view, creating an interlocking design. End block 86 extends underneath block 88 in a close tolerance so that both end block 86 and block 88 create a composite face applying a force towards block 89 when the locking nut 80 is tightened. When pressure is applied to the string 14, the force is applied above the axis of the bolt 85 so that the end blocks 86 and 87 would tilt out unless prevented from doing so. The interlocking relationship between end block 87 and block 91 and the nested relationship between end block 86 and block 88 prevents the end blocks 86 and 87 from tilting outward, reducing the bending force applied to the bolt 85 to ease tightening the locking nut 80.

Figures 13A, 13B, 13C, 13D, 13E, 13F, 13G, 13H, 13I, 13J:
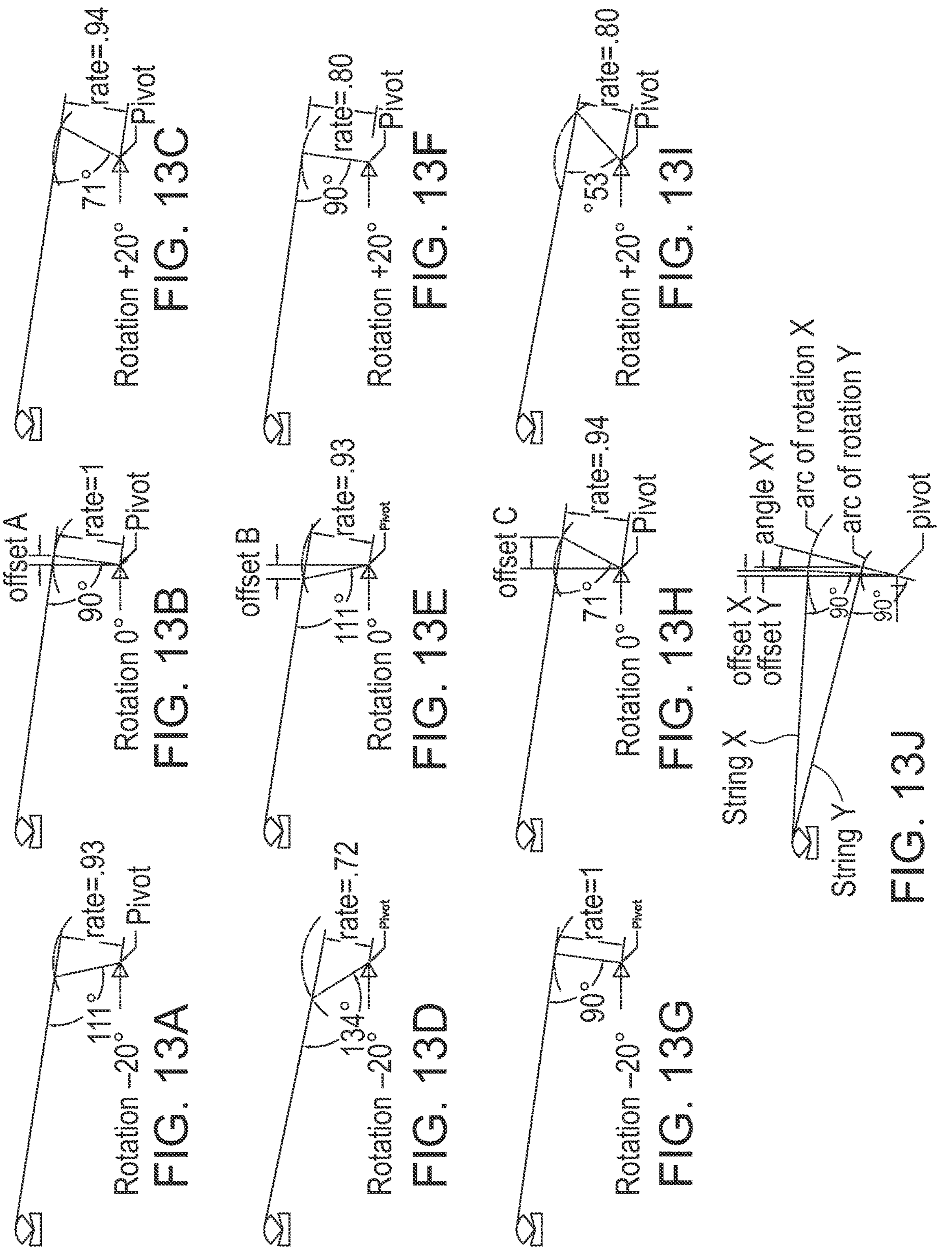
FIGS. 13A-13J are diagrams showing the impact of the string guide offsets on pitch change when the tailpiece is rotated.

In FIGS. 13A-13J are diagrams showing the impact of the string guide 13 offsets on pitch change when the moveable tailpiece assembly 11 is rotated. FIGS. 13A-13C show offset A, where the string is tangent to the arc of rotation, so the rate of pitch change is similar for an up or down rotation (0.93 and 0.94 for a −20° rotation and +20° rotation, respectively). FIGS. 13D-13F show offset B, where the string 14 is in front of the tangent point, so the rate of pitch change is greater with up rotation and less with down rotation (0.72 and 0.80 for a −20° rotation and +20° rotation, respectively). FIGS. 13G-131 show offset C, where the string 14 is in back of a tangent point, so the rate of pitch change is less with up rotation and greater with down rotation (1 and 0.80 for a −20° rotation and +20° rotation, respectively). FIG. 13J shows the different arc of rotation needed for string X, a high stretch string, compared to string Y, a low stretch string. The rate of pitch change is primarily determined by the arc of rotation, where the larger the arc of rotation, the more the pitch changes. Higher stretch strings need a larger arc of rotation than strings with lower stretch. Therefore, lower stretch strings pull down at a greater angle than high stretch strings, thus they require a larger offset to make the strings tangent to the arc of rotation.

What has been described is a calibrated vibrato and locking nut for use with stringed musical instruments. In this disclosure, there are shown and described only exemplary embodiments of the invention, but, as aforementioned, it is to be understood that the invention is capable of use in various other combinations and environments and is capable of changes or modifications within the scope of the inventive concept as expressed herein.

From the foregoing disclosure and detailed description of certain preferred embodiments, it is also apparent that various modifications, additions and other alternative embodiments are possible without departing from the true scope and spirit. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A calibrated vibrato, which comprises:

a moveable tailpiece assembly comprising:

a plurality of pre-set string guides, each pre-set string guide having an offset and height configured for a specific type of string; and a tuner holding a ball end of a string, wherein the pre-set string guides are configured to keep a conventional set of strings in relative tune when the calibrated vibrato is activated, and the tuner further comprises:

a body mounted on at pivot point;

an indented portion on the body configured to hold the ball end of a string;

a threaded opening on the body with an axis in a direction normal to the pivot point;

a string path on the body, located between the indented portion and the threaded opening; and a threaded rod configured to axially displace the threaded opening.

2. The calibrated vibrato of claim 1, wherein:

the pre-set string guides are mounted on an upper surface of the moveable tailpiece assembly opposite a post extending from a lower surface, the post having a proximate end towards the string guides and a distal end away from the string guides;

the moveable tailpiece assembly rotatably mounted to a fixed tailpiece base; and a spring attached on a first end to the distal end of the post and attached on an opposite end at a spring fixture fixed relative to the fixed tailpiece base.

3. The calibrated vibrato of claim 2, wherein:

a spring is attached on a first end to the distal end of the post and attached on an opposite end at a spring mount attached to the spring fixture.

4. The calibrated vibrato of claim 3, wherein:

the spring comprises a coil spring; and the spring mount being displaceable in a direction along an axis of the coil spring.

5. The calibrated vibrato of claim 4, further comprising a rod with a threaded portion on one end and a thumb wheel fixed to an opposite end;

wherein the spring mount comprises a threaded opening corresponding with the threaded portion of the rod, where the threaded opening is configured to displace the spring mount in an axial direction of the rod; and wherein the spring mount is configured to slide relative to the spring fixture.

6. The calibrated vibrato of claim 2, wherein the calibrated vibrato is configured to have at least:

a first locked position restricting movement of the moveable tailpiece relative to the fixed tailpiece base; and an unlocked position where movement of the moveable tailpiece relative to the fixed tailpiece base is unrestricted.

7. The calibrated vibrato of claim 6, wherein the calibrated vibrato is configured to have at least:

a second locked position restricting movement of the moveable tailpiece relative to the fixed tailpiece base; and a third locked position restricting movement of the moveable tailpiece relative to the fixed tailpiece base.

8. The calibrated vibrato of claim 6, further comprising:

wherein the fixed tailpiece base further comprises a rotatably attached lever comprising a protrusion facing the moveable tailpiece assembly;

wherein the moveable tailpiece assembly further comprising an indentation facing the protrusion on the lever, the indentation configured to engage the protrusion; and wherein the protrusion is configured to engage at least a locked position and an unlocked position.

9. The calibrated vibrato of claim 1, further comprising:

at least one string passing through a pre-set string guide on a proximate end; and wherein the string passes through a locking nut on a distal end.

10. The calibrated vibrato of claim 9, wherein the locking nut further comprises:

a base fixed relative to the fixed tailpiece base;

the base having a generally U-shaped profile with a first wall facing towards the pre-set string guides, a second wall facing away from the pre-set string guides, a height, a length and a width;

wherein the first wall comprises a radiused upper portion configured to act as a zero-fret;

a central block fixed to the center of the base, the central block having a cylindrical opening in a direction parallel to the length of the base;

a first end block, a second block and a third block, each having a cylindrical opening in a direction parallel to the length of the base;

the first end block comprising an extension positioned between the second block and the base, wherein the second block has a bottom that is configured to nest into a top surface of the extension from the first end block;

the third block comprising an internal void configured to interlock with a second end block;

the second end block comprising a threaded opening with an axis in a direction parallel to the length of the base, wherein the threaded opening is configured to be positioned in the internal void of the third block when engaged in locking strings;

the central block, the first end block, the first block, the second block and the second end block being configured to fit within the U-shaped profile of the base;

a bolt comprising a head on one end and a threaded area on an opposite end, the threaded area configured to engage the threaded opening on the second end block; and the end block comprising an internal open space at least as large as the cylindrical openings along an axis of the bolt.

11. The calibrated vibrato of claim 10, wherein:

the second wall of the locking nut base further comprises notches corresponding to locations where the first end block and the first block contact one another, where the first block and central block contact one another, where the central block and the second block contact one another and where the second block and the second end block contact one another.

12. The calibrated vibrato of claim 1, wherein the pre-set string guides are mounted to the moveable tailpiece assembly with a through-mounted screw and wherein an adjustment spring is located between the pre-set string guides and the moveable tailpiece assembly, the adjustment spring also being located axially about the screw.

13. A calibrated vibrato, which comprises:

a moveable tailpiece assembly comprising:

a plurality of pre-set string guides, each pre-set string guide having an offset and height configured for a specific type of string, wherein the pre-set string guides are configured to keep a conventional set of strings in relative tune when the calibrated vibrato is activated, the pre-set string guides are mounted on an upper surface of the moveable tailpiece assembly opposite a post extending from a lower surface, the post having a proximate end towards the string guides and a distal end away from the string guides, the moveable tailpiece assembly is rotatably mounted to a fixed tailpiece base;

a spring is attached on a first end to the distal end of the post and attached on an opposite end at a spring fixture fixed relative to the fixed tailpiece base, and the fixed tailpiece base comprises a triangular protrusion facing the moveable tailpiece assembly and the moveable tailpiece assembly comprises a triangular relief facing the fixed tailpiece base, the triangular protrusion and relief configured to contact one another and allow rotation of the moveable tailpiece assembly relative to the fixed tailpiece base.

14. The calibrated vibrato of claim 13, wherein the moveable tailpiece further comprises a tuner holding a ball end of a string, the tuner comprising:

a body mounted on at pivot point;

an indented portion on the body configured to hold the ball end of a string;

a threaded opening on the body with an axis in a direction normal to the pivot point;

a string path on the body, located between the indented portion and the threaded opening; and a threaded rod configured to axially displace the threaded opening.

15. A locking nut for use on stringed musical instruments, comprising:

a fixed base;

the base having a generally U-shaped profile with a first wall and a second wall, a length, a height and a width;

a central block fixed to the center of the base, the central block having a cylindrical opening in a direction parallel to the length of the base;

a first end block, a second block and a third block, each having a cylindrical opening in a direction parallel to the length of the base;

the first end block comprising an extension positioned between the second block and the base, wherein the bottom of the second block is configured to nest into a top surface of the extension from the first end block;

the third block comprising an internal void configured to interlock with a second end block;

the second end block comprising a threaded opening with an axis in a direction parallel to the long direction of the base, wherein the threaded opening is configured to be positioned in the internal void of the third block, when engaged in locking strings;

the central block, the first end block, the first block, the second block and the second end block being configured to fit within the U-shaped profile of the base;

a bolt comprising a head on one end and a threaded area on an opposite end, the threaded area configured to engage the threaded opening on the second end block; and the end block comprising an internal open space at least as large as the cylindrical openings along the axis of the bolt.

16. The locking nut of claim 15, wherein:

the second wall of the locking nut base further comprises notches corresponding to the locations where the first end block and the first block contact one another, where the first block and central block contact one another, where the central block and the second block contact one another and where the second block and the second end block contact one another.

17. The locking nut of claim 16, wherein the first wall comprises a radiused upper portion configured to act as a zero-fret.

* * * * *